July 11, 1939.                F. H. KRANZ                2,165,489
              GAS LIQUID CONTACT APPARATUS AND METHOD
                       Filed March 14, 1936

INVENTOR
Frederick H. Kranz
BY
ATTORNEY

Patented July 11, 1939

2,165,489

UNITED STATES PATENT OFFICE 2,165,489

GAS LIQUID CONTACT APPARATUS AND METHOD

Frederick H. Kranz, Buffalo, N. Y., assignor to National Aniline & Chemical Company, Inc., New York, N. Y., a corporation of New York Application March 14, 1936, Serial No. 68,931

3 Claims. (Cl. 261—94)

The present invention relates to gas-liquid contact apparatus and particularly to a fractionating or absorption column of the packed tube type. The invention relates further to an improved method of effecting the intimate contact of gases and liquids, particularly in processes which involve fractionation or gas-absorption.

In commercial processes of fractionation, two kinds of fractionating columns, are in general use; namely, packed columns and plate columns of the bubbler cap and sieve types. Packed columns have not come into extensive use for commercial installations of large capacity, one reason being that when the diameter of the column is increased to increase the capacity, the efficiency of the column is greatly reduced. Thus in the past it has been the practice to install the more expensive plate column in situations where large capacity is desired.

The present invention provides a fractionating column which is simple in construction and is adapted for large capacity operation; and compared with a plate column of equal capacity, it is more efficient and less expensive. In accordance with the present invention a multiplicity of tubes of small and substantially uniform diameter are provided, arranged as a nest of tubes spaced from each other and containing packing material, the packing material extending upwardly in the tubes to a height many times the diameter of the individual tube. Preferably the packing should extend to a height at least 25 times the diameter of the tube.

Figure 1:
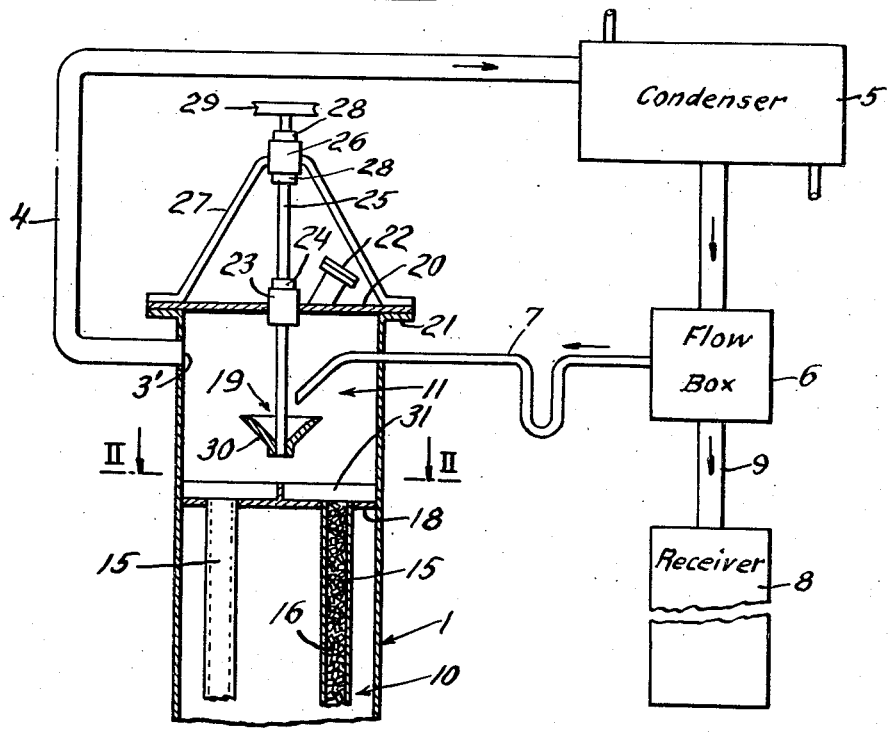
Figure 1:
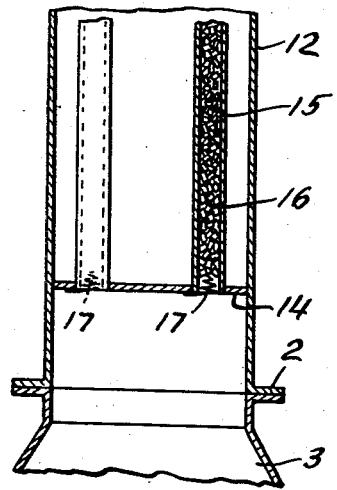
Figure 2:
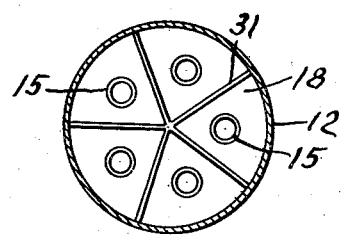

Further objects and advantages will be apparent from a consideration of the following description taken in connection with the accompanying drawing, wherein, Fig. 1 is a vertical section through the fractionating column, parts related therewith being shown diagrammatically; and Fig. 2 is a horizontal section taken on the line II—II in Fig. 1.

The fractionating column I is secured at its lower end by a flange 2 to the upper end of a still 3, a portion of which is broken away in the drawing. At the upper end of column I is an outlet 3' in which is secured a pipe 4 to conduct the vapor distillate to condenser 5. The condensate outlet from the condenser 5 is connected with a flow box 6 from which a portion of the condensate refluxes through the pipe 7 to the fractionating column and the remainder of the condensate is carried to the receiver 8 which is connected with the flow box 6 by a pipe 9.

In general, the fractionating column I is composed of a packed tube section 10 and a reflux distributing section 11, both of which are contained within a large diameter pipe 12. Near the lower end of pipe 12 is a tube plate 14 secured about its periphery to the pipe. Within openings of the tube plate 14 are secured the lower ends of a multitude of spaced tubes 15. The tubes 15 are filled to a height at least 25 times the diameter of the tubes with conventional packing material 16 which suitably may be Raschig rings. The packing material in the tubes is supported by conventional means as, for example, a tapered spiral 17 of wire or a slotted cap attached to the lower end of each tube. Spaced from the upper end of the pipe 12 is a second tube plate 18 which is also secured about its periphery to the pipe. The upper ends of each of the tubes 15 are secured in openings in the plate 18.

To distribute reflux distillate returning through the pipe 7 which enters the distributing section 11 of the pipe 12 above the tube plate 18 there is provided a sprayer 19. The upper end of pipe 12 is closed with a cover 20 which is secured to a flange 21 about the end of the pipe. Eccentrically placed in the cover is a sight glass 22 through which the distributing action within the pipe may be observed. Centrally placed in the cover is a bearing 23 within the upper end of which is packing material held in place by packing nut 24. Shaft 25 carried by the bearing 23 is supported at its upper end by bearing 26 rigidly supported from the cover 20 by means of arms 27. To retain shaft 25 in proper vertical adjustment, safety collars 28 are provided thereon both above and below the bearing 26. Keyed to the upper end of shaft 25 is a drive pulley 29, driven from any suitable source of power. Secured to the lower end of the shaft is a conical sprayhead 30 forming a cup into which the reflux pipe 7 delivers the refluxed distillate. Immediately above the tube plate 18 and secured thereto is a multitude of partitions 31 dividing the upper surface thereof into a multitude of equal segmental compartments within each of which is the upper end of one of the tubes 15. As the sprayhead 30 delivers an equal quantity of distillate in all directions the quantity delivered to each compartment and hence to each tube is equal.

In such a column the adverse effects of an increase in diameter of the tubes upon efficiency of fractionation or absorption can be offset almost completely by the beneficial effect of an increase in the packed height of the tube, providing the diameter of the said tube does not exceed about three inches. However, the beneficial effect of increased packed length of tube becomes progressively less as the diameter of the tube increases, and is insufficient to offset the loss of efficiency which results when the diameter of the tube substantially exceeds about three inches. In general, the invention is not limited to any particular number or size of tubes, but in a preferred embodiment of the invention the tubes do not exceed about three inches in diameter, and are packed to a height which is not less than about 25 times the diameter of the tubes.

The chamber in the tube section 10 between the tubes 15 may contain air and rely upon this alone to dissipate heat, or, if desired, suitable inlet and outlet ports may be provided to conduct any suitable liquid temperature controlling medium through the tube section 10 of the column, if such is desirable for the particular material being fractionated, or it may be filled with a suitable packing material, for example, infusorial earth, glass, wool, asbestos, to decrease radiation.

In operation, material is introduced into still 3 in any suitable manner and is heated to drive vapors upwardly into the fractionating column 1. The system may be run under reduced pressure applied to the receiver if desired. Vapors rising in the column 1 enter the tubes 15 where they are fractionated by their passage countercurrent to the reflux. The vapors after partial condensation due to fractionation enter the distributing section 11 which they leave by way of the opening 3', from which they are conducted by a pipe 4 to the condenser 5. The condensate therefrom is delivered to the flow box 6, from which a portion is returned to the distributing section 11 and the remainder is delivered to the receiver 8. The refluxed condensate is distributed equally and continuously by the sprayer 19 to the various tubes 15. As the tubes 15 are spaced from each other, the tubes are of equal diameter and the reflux to each tube is equal, the fractionation obtained in the various tubes is equal, thereby maintaining the efficiency of the unit. Thus, a unit containing a multiplicity of tubes one inch or less in diameter, packed to a height of eight feet with $\frac{3}{32}$ or $\frac{1}{4}$ inch Raschig rings, has an efficiency equal that of a thirty to thirty-five plate column of the bubble cap type.

Exemplary of the operation of the fractionating column, is the following illustration:

A column comprising 5 iron tubes, each 16 feet long and 2 inches in diameter, and packed with $\frac{3}{8}$ inch Raschig china rings to a height of 16 feet, was used in a still system, for fractionating a mixture comprising aniline, mono- and diethylaniline. The still system was operated with a pressure differential between top and bottom of the system of about 40 mm. of mercury. The output of the system was 5 pounds per hour at a reflux ratio of 2:1. The total charge of 165 lbs. containing 58.4% or 96.4 lbs. of monoethylaniline, resulted in a total distillate recovery of 145 lbs. In the distillate, the fraction from 38 to 88% of the total distillate had a composition of 91.6% monoethylaniline and was aniline free.

While the invention in its preferred aspect involves the adaptation of the column to a process of fractionation, in its broader scope the invention contemplates the use of the column wherein efficient contact of liquid and gas is desired. For example, in gas absorbing and scrubbing towers the gas inlet would be at the bottom of pipe 1, and the wash fluid would be delivered to the upper ends of tubes 15 by the pipe 7 and sprayer 19.

It should be understood that the term "gas" as used in the appended claims refers to the physical state, regardless of whether or not the gas is condensable to a liquid at the operating temperature by pressure alone.

As various changes may be made in the specific embodiment without departing from the invention, it will be understood that the invention is not limited thereto.

I claim:

1. A gas-liquid contact apparatus comprising a shell, a multiplicity of spaced, packed, vertical tubes within said shell, said tubes being joined together at their ends by tube plates defining headers above and below said tubes, said shell, tube plates and tubes defining a heat dissipating chamber, said tubes being not in excess of three inches in diameter, all of said tubes being of equal diameter, the packing in said tubes extending to a height at least twenty-five times the diameter of said tubes, and means to distribute liquid substantially equally among said tubes.

2. A process of fractionating materials, which comprises dividing a stream of vapor into a plurality of separate ascending vertical streams each confined to a path of small diameter, passing said plurality of streams countercurrent to a plurality of liquid reflux distillate streams flowing downwardly through columns of packing of a height at least twenty-five times the diameter of said vapor streams whereby a portion of said vapor is condensed, each of said vapor streams being individual to a reflux distillate stream and flowing countercurrently to said reflux distillate stream throughout the height of the column of packing over which said reflux distillate stream flows, joining said plurality of streams into a stream of distillate, condensing said distillate, dividing a portion of said distillate in equal quantities among said plurality of vapor streams at their upper ends, and flowing each of said quantities of distillate, as reflux, downwardly through one of said columns of packing in contact with and countercurrent to one of said plurality of vapor streams to form said reflux distillate streams.

3. A gas-liquid contact apparatus comprising a shell, a multiplicity of spaced, packed, vertical, small diameter tubes within said shell, said tubes being joined together at their ends by tube plates defining headers above and below said tubes, said shell, tube plates and tubes defining a heat-dissipating chamber, said tubes being of sufficiently small diameter to prevent channeling of liquid flowing downwardly therethrough over the packing, all of said tubes being of equal diameter, the packing in said tubes extending to a height at least twenty-five times the diameter of said tubes, and means to distribute liquid substantially equally among said tubes.

FREDERICK H. KRANZ.